United States Patent [19]

Radebold et al.

[11] 4,254,090

[45] Mar. 3, 1981

[54] COMBINED SYNTHESIS OF HYDRAZINE AND HYDROGEN PEROXIDE

[76] Inventors: Reinhart Radebold, Quastenhornweg 14a, 1 Berlin 22; Werner Seiler, Bondickstrasse 67d, 1 Berlin 28, both of Fed. Rep. of Germany

[21] Appl. No.: 854,771

[22] Filed: Nov. 25, 1977

[30] Foreign Application Priority Data

Nov. 29, 1976 [DE] Fed. Rep. of Germany ....... 2654514

[51] Int. Cl.³ ............................................. C01B 21/16
[52] U.S. Cl. ..................................... 423/407; 204/68; 423/586
[58] Field of Search .......................... 204/59 R, 63, 68; 423/586, 648 R, 641, 413, 407

[56] References Cited

U.S. PATENT DOCUMENTS 4,127,453  11/1978  Radebold .......................... 204/59 R

FOREIGN PATENT DOCUMENTS 713792  8/1954  United Kingdom ..................... 423/407

Primary Examiner—O. R. Vertiz
Assistant Examiner—Wayne A. Langel
Attorney, Agent, or Firm—Smyth, Pavitt, Siegemund & Martella

[57] ABSTRACT

A method for synthesizing hydrazine and hydrogen peroxide employing water, hydrogen, and nitrogen as reactants.

5 Claims, 3 Drawing Figures

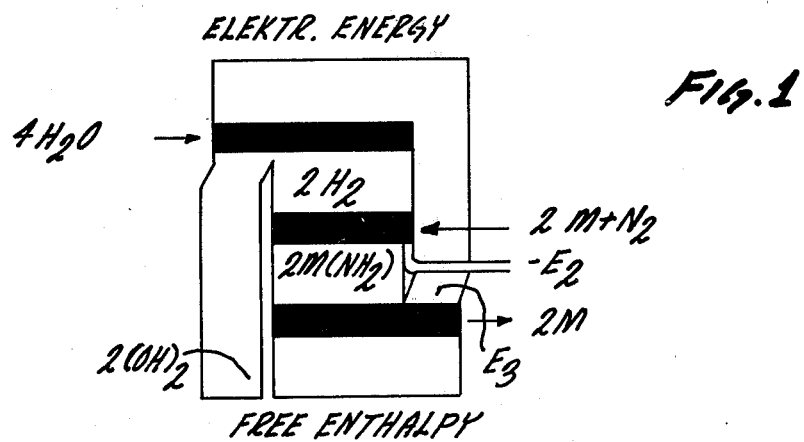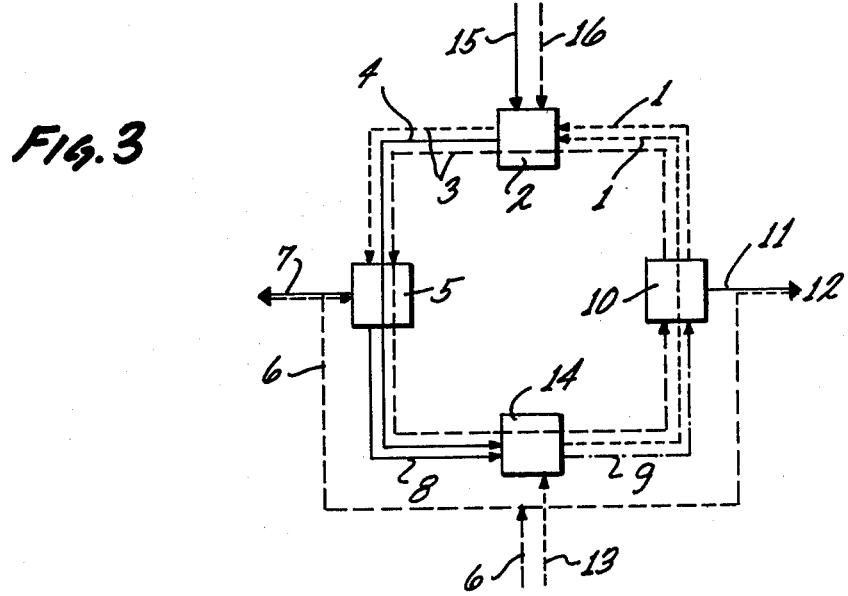

ENTHALPY $\Delta H_B$ OF FORMATION AND FREE ENTHALPY $\Delta G_B$ OF FORMATION AS FUNCTION OF TEMPERATURE FOR $H_2O$, $H_2O_2$, $Na_2O_2$ AND $Li_2O$ (SOURCE GMELIN)

COMBINED SYNTHESIS OF HYDRAZINE AND HYDROGEN PEROXIDE

As explained in P 24 05 134 filed from Jan. 30, 1974, both hydrazine and hydrogen-peroxide are considered as liquid energy carriers, which will be synthesized simultaneously starting from water and nitrogen from air by applying electrical energy, and which will, when in contact, disintegrate into water and nitrogen releasing energy. (Both agents might be regarded as the two components of a liquid two-component fuel generally substituting hydrocarbons as well as oxygen in a future power technology). As explained in detail in the above mentioned application it is solar energy, which will be converted in a first step into electrical energy; this electrical energy is provided for the synthesis of both fuel components in a subsequent step: Electrical energy is stored in form of chemical energy. The combined process for synthesis is based on alkali metals as temporary substitutes for hydrogen, which fact strongly simplifies the course of reactions. Instead of ammonia for example an alkali-amide is used, as explained in the above mentioned application, which is converted by anodic oxidation into hydrazine and alkalimetal. The advantage of doing so is the easy fixation of both molecular hydrogen and nitrogen by an alkali metal in form of an $NH_2$—group resulting in a fused alkali-amide. There is no need for the energy-consuming HABER-BOSCH-synthesis in order to generate $NH_2$—groups, which afterwards have to be coupled to hydrogen to form the gaseous compound $H-NH_2$.

In this invention an additional way is described for an oxidation easy to be performed of both alkali-amide to get anhydrous hydrazine and of water to get hydrogen-peroxide as the anticipated, later to be stabilized, final products of this synthesis by making use of the same electron-donor-acceptor couple. The energy supply of this synthesis is provided by electrical energy as well as of heat at medium temperature for rebuilding of the donor-acceptor couple by electrolysis.

The electron-donor used is metallic sodium:

$$2Na \rightarrow 2Na^+ + 2e^- \quad (1)$$

The electron-acceptor is fused $Na_2O_2$ at a temperature above 690° K.:

$$Na_2O_2 + 2e^- \rightarrow 2NaO^- \quad (2)$$

The overall reaction performed is in total:

$$2Na + Na_2O_2 \rightarrow 2Na_2O \quad (3)$$

The free enthalpy of formation $\Delta G$ for $Na_2O_2$ and $Na_2O$ respectively at 800° K. is:

$\Delta G\ (Na_2O_2 - 2Na - O_2) = -81,5$ kcal/mol $\Delta G\ (Na_2O - 2Na - O_2/2) = -72,5$ kcal/mol In order to regenerate metallic Na and $Na_2O_2$ in accordance to the overall reaction (3) by reversing it a free enthalpy of reaction $\Delta G\ (2\ Na + Na_2O_2 - 2\ Na_2O) = (-81,5 + 145)$ kcal/mol
$= +63,5$ kcal/mol in form of electrical energy has to be provided.

FIG. 1 is an energy-flow-diagram for the coupled synthesis of both $N_2H_4 + 2H_2O_2$ using an alkali metal M.

FIG. 3 illustrates an example on how to produce anhydrous hydrazine and hydrogen peroxide on the basis of the $Na/Na_2O$ — couple.

Figure 2:
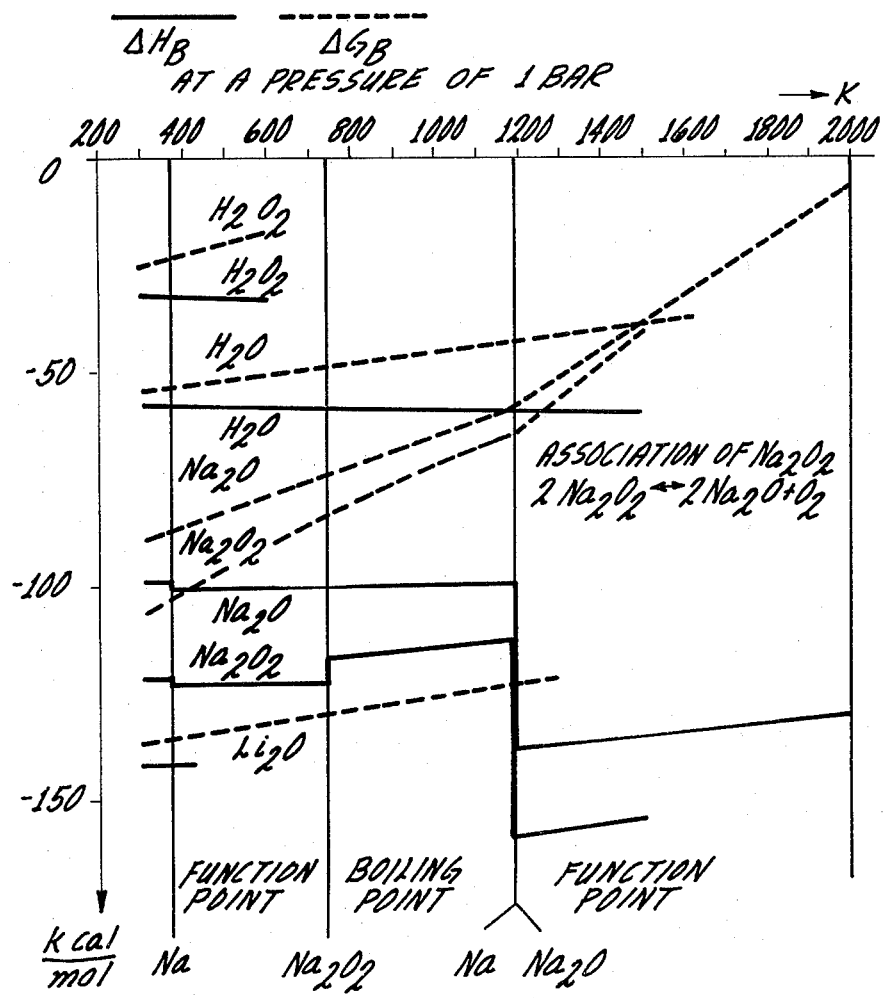
FIG. 2 is a diagram of enthalpy $\Delta H_B$ of formation and free enthalpy $\Delta G_B$ of formation for $H_2O$, $H_2O_2$, $Na_2O$, $Na_2O_2$ and $Li_2O$ as function of temperature (source: Gmelin).

1. Process for the generation of anhydrous final products

A general example is given in the following how to produce anhydrous hydrazine and hydrogen-peroxide on the basis of the $Na/Na_2O_2$-couple.

In the first step $H_2O$ as one of the raw materials for this synthesis is oxidized to form hydrogen-peroxide:

$$4H_2O + 2Na_2O_2 \rightarrow 2H_2O_2 + 4NaOH \quad (4)$$

In the same way alkali-amide is oxidized to form anhydrous hydrazine:

$$2NaNH_2 + Na_2O_2 \rightarrow N_2H_4 + 2Na_2O \quad (5)$$

Hydrazine and hydrogen-peroxide are separated (from the other reaction products) and can be stabilized by addition of water. In the second step hydrogen will be generated for the formation of amide by introduction of Na:

$$4Na + 4NaOH \rightarrow 2H_2 + 4Na_2O \quad (6)$$

which subsequently will be fixed at Na together with nitrogen from air as the other raw material to get alkali-amide:

$$2Na + 2H_2 + N_2 \rightarrow 2NaNH_2 \quad (7)$$

In total the following molecules have been synthesized:

$$4H_2O + N_2 \rightarrow 2H_2O_2 + N_2H_4 \quad (8)$$

by converting:

$$6Na + 3Na_2O_2 \rightarrow 6Na_2O \quad (9)$$

The regeneration of the latter is performed electrolytically by reversing reaction (3) (three times):

$$6\ Na_2O \xrightarrow{\dot{E}} 6\ Na + 3\ Na_2O_2 \quad (10)$$

which process consumes electrical energy $\dot{E} \geq 3.63,5$ kcal = 190 kcal for each two moles hydrogen-peroxide and one mole of hydrazine. The above given number (for the energy consumption) is expressed in kWs per unit mass of the two-component fuel using the molecular mass $m = 0,1$ kg/ml as follows:

$\dot{E} \geq 8$ MWs/kg

It should be noted that the free enthalpy of formation for hydrazine and hydrogen-peroxide from water and nitrogen corresponds very well to the free enthalpy of electrolytic regeneration of the $2Na/Na_2O_2$— couple:

$\Delta G\ (N_2H_4 + 2\ H_2O_2 - 4\ H_2O - N_2) = 195$ kcal/mol

2. Process for the generation of hydrazine-hydrate

A modification of the process explained in the first example permits to perform some of the reactions in an aqueous and therefore stabilizing medium. For this purpose ammonia is generated as an intermediate gaseous product from the sodium-amide when the sodium is replaced by hydrogen; the ammonia is then oxidized with $H_2O_2$ which is generated additionally.

In this case six (instead of four) moles $H_2O$ are oxidized in the first step to form hydrogen-peroxide:

$$6H_2O + 3Na_2O_2 \rightarrow 3H_2O_2 + 6NaOH \tag{11}$$

Ammonia is oxidized in aqueous solution with the $H_2O_2$ generated in excess to form hydrazine-hydrate:

$$2NH_3 + H_2O_2 \rightarrow (N_2H_4) \cdot H_2O + H_2O \tag{12}$$

The formation of sodium-amide takes place as explained in equations (6) and (7); the two moles of NaOH left are provided for the generation of ammonia:

$$2NaNH_2 + 2NaOH \rightarrow 2Na_2O + 2NH_3 \tag{13}$$

in this process the energy consumption does not differ from that in example 1 due to:

$$6Na + 3Na_2O_2 \rightarrow 6Na_2O \tag{14}$$

which have to be converted by electrolysis.

3. Synthesis with simultaneous $N_2$-production

The different reactions as described in both foregoing processes have been verified experimentally. Both processes are based on nitrogen as the other raw material, which must be separated from air according to well-known methods.

A further alternative of the basis process (1) is to oxidize the sodium-amide using air to form water-free hydrazine, thus obtaining nitrogen as a raw material for the amide formation by consumption of the oxygen (the existing parts of $CO_2$ and rare gases are to be separated).

The first step of this process is as follows:

$$4H_2O + 2Na_2O_2 \rightarrow 2H_2O_2 + 4NaOH \tag{4}$$

The air supplied is assumed to be a mixture of $(O_2 + 4N_2)$:

$$2NaNH_2 + O_{2/2} + 2N_2 \rightarrow N_2H_4 + Na_2O + 2N_2 \tag{15}$$

The remaining steps of the amide formation are the same as described by (6) and (7).

In this process are formed as final products:

$$2H_2O_2 + N_2H_4 + N_2$$

Different from the foregoing processes the following molecules react:

$$6Na + 2Na_2O_2 + O_{2/2} \rightarrow 5Na_2O \tag{16}$$

due to the fact that half a mole of oxygen has to be released to the ambience from which it was taken before. The electrolytic regeneration, therefore, must be controlled in such a way (in reversal of (16)) that the oxygen to be released can be generated for example by decomposition of $Na_2O_2$ to form $Na_2O$ and $O_{2/2}$ at higher temperature.

The oxidation of sodium-amide using air according to (15) has been approved in experiment as well as the electrolysis with generation of oxygen in reversal of equation (16).

4. Catalysis-free synthesis via Li

The processes so far described are based on the formation of sodium-amide from the elements. It is well-known that this formation takes much more time than that in which Li is used instead of Na, although a catalyst—similar to that provided for the HABER-BOSCH-synthesis—must be used. In contrast to Na Li is able to react easily and without catalyst to compose nitrides in the form of $Li_3N$, which can be converted by successive addition of hydrogen first into imides of the form $Li_2NH$ and then into amides of the form $LiNH_2$. In order to form the amide it is, therefore, obvious to use Li and to replace the Li by Na in a substitution reaction, in which the former reacts simultaneously with nitrogen from oxygen-free air (or by nitrogen supplied from other sources) to form $Li_3N$.

The reactions are made in the same way as in the third process via (4) and (15):

$$4H_2O + 2Na_2O_2 \rightarrow 2H_2O_2 + 4NaOH \tag{4}$$

$$2NaNH_2 + O_{2/2} + 2N_2 \rightarrow N_2H_4 + Na_2O + 2N_2 \tag{15}$$

$$4Na + 4NaOH \rightarrow 2H_2 + 4Na_2O \tag{16}$$

except that in a first step nitrogen is fixed to Li and then hydrogen is fixed in a second step:

$$6Li + N_2 \rightarrow 2Li_3N \tag{17}$$

$$2Li_3N + 2H_2 \rightarrow 2LiNH_2 + 4Li \tag{18}$$

The lithium-amide reacts with Na to get sodium-amide and free lithium:

$$2LiNH_2 + 2Na \rightarrow 2NaNH_2 + 2Li \tag{19}$$

the latter of which is fixed during the next cycle of nitride generation according to (17) appropriate in the same way as that released during hydrogenetion (18). The conversion-reaction (19) approved by experiment proceeds in a slightly endergonic manner because the free enthalpies of formation do differ only by little; it is approximately:

$$\Delta G \ (NaNH_2) - \Delta G \ (LiNH_2) \approx 15 \ kcal/mol$$

Also in this process there are converted:

$$6Na + 2Na_2O_2 + O_{2/2} \rightarrow 5Na_2O \tag{16}$$

The electrolysis is forced to deliver oxygen in the same way as in the preceding process.

5. Catalysis-free synthesis via Li with direct H-feeding

In the previous processes it was inevitable that free hydrogen is generated during the reaction (6). After having introduced first Li with the sole purpose to fix nitrogen and hydrogen it is worthwhile to consider Li to act directly as an electron-donor instead of Na. By this the direct transfer of H-atoms from NaOH becomes possible—as will be demonstrated below—without any need of intermediate storage of gaseous $H_2$.

The process runs as follows:

$$4H_2O + 2Na_2O_2 \rightarrow 2H_2O_2 + 4NaOH \tag{4}$$

$$2LiNH_2 + Na_2O_2 \rightarrow N_2H_4 + 2LiNaO \qquad (20)$$

hereby a mixed oxide will appear composed from lithium and sodium, the thermodynamic data of which could not yet be determined.

First the lithium-nitride is formed according to (17):
$$6Li + N_2 \rightarrow 2Li_3N \qquad (17)$$

The hydrogen is directly transferred from NaOH:

$$2Li_3N + 4NaOH \rightarrow 2LiNH_2 + 4 LiNaO \qquad (21)$$

Even in this short synthesis the following molecules are converted on the one hand:

$$4H_2O + N_2 \rightarrow N_2H_4 + 2 H_2O_2$$

and on the other hand - in contrast to all other processes:

$$6Li + 3Na_2O_2 \rightarrow 6LiNaO \qquad (22)$$

In consequence the lithium has taken the role of the electron-donor. The back-reaction by reversing (22) is performed by electrolysis:

$$6 LiNaO \xrightarrow{E} 6 Li + 3 Na_2O_2 \qquad (23)$$

The energy demand has not been measured so far.

In equation (2) we have tried to give a clear presentation in form of an overall-reaction including the alkali metal cation $Na^+$. In reality the electron-acceptor within the $Na_2O_2$ is the peroxide anion $O_2^{2-}$, which changes into the oxide anion $O^{2-}$ by electron absorption:

$$O_2^{2-} + 2e^- \rightarrow 2O^{2-} \qquad (24)$$

The following figures are added: an energy-flow diagram for the coupled synthesis, from which the energetic importance of the hydrogen transferred can be seen, and a diagram showing the thermodynamic data of the substances used as a function of temperature.

FIG. 3 illustrates an example for carrying out the process 1 as outlined above. Sodium oxide is fed in a suitable manner via a feeder path 1 into a heated electrolytic bath 2 in which the $Na_2O$ is molten and dissolved in (already) molten $Na_2O_2$. This way one reduced the effective melting point of the mixture to about 450° C., because $Na_2O$ has a much higher melting point. The molten mixture has a rather high electric conductivity so that electrolysis is easily accomplished, leading to metallic Na by way of cathodic reduction and replenishing further the $Na_2O_2$ content by anodic oxidation (see equation 10, supra). The temperature in the bath should not rise significantly above the melting temperature of the mixture, otherwise the peroxide will decompose to a substantial extent, thereby parasitically reoxidising some of the metallic sodium that has just been produced.

A portion of the $Na_2O_2$ is extracted via the path 3 and metallic Na is taken via a path 4. The $Na_2O_2$ is fed to a reactor 5 per se, and used to cause water to react at low temperature, resulting in $H_2O_2$ and NaOH, respectively (equation 4, supra). The water is fed via a path 6 to the reactor 5 and the two reaction products are extracted from the reactor 5 via branches 7 and 8. Branch 7, therefore, is the output of discharge path for one of the products to be made, namely hydrogen peroxide. The remaining $Na_2O_2$ that is not being reacted is separately extracted as symbolically indicated by a continuation of a portion of path 3 and is fed to a reactor to be mixed therein with molten sodium-amide fed to the reactor via feeder path 9. The reactor 10 realizes equation 5 and causes the production of hydrazine and $Na_2O$, the latter being returned to the electrolytic vessel 2 via path 1.

The hydrazine production and extraction is carried out at a low pressure to permit rapid discharge of the hydrazine via a pressure gradient path 11. The hydrazine as extracted is adiabatically cooled by decompression and is stabilized with water into hydrazine-hydrate. Thus water (path 6) is added to the extracted hydrazine (path 11), resulting in the outflow of hydrazine-hydrate through exit 12.

The sodium amide is produced in a reactor 14 by a catalytic reaction of metallic sodium with $N_2$ and $H_2$ at a temperature not exceeding 350° C. at a pressure not exceeding 20 bars (equation 7, supra). The required hydrogen is likewise produced in the reactor vessel 14, namely by causing NaOH to react with metallic sodium in the molten state in the reactor 14 and at a temperature of about 320° C. (equation 6, supra). The resulting $Na_2O$ is likewise returned to electrolytic vessel 2. The metalic sodium used in these reactions is extracted from the electrolytic vessel 2; reference numeral 13 refers to a nitrogen feeder path for the reaction vessel 14.

This completes the description of the particular combined process. The electrolysis requires a certain amount of electrical energy which is symbolically denoted by reference numeral 15 in the FIG. 3 and reference numeral 16 refers to the heat input of the electrolytic vessel 2. FIG. 2 depicts qualitatively the relationship of the energy requirements.

As far as the above mentioned process 2 is concerned, there exists a variety of possibilities for having $NH_3$ react with $H_2O_2$ to obtain hydrazine in accordance with equation 12, supra. The choice here depends upon the state of the reacting components. The $NH_3$ is at first produced from alkaliamide and alkalihydroxide in the molten state and is extracted from the reaction in the gaseous state. The residue is $Na_2O$. Now, the first possibility is comprised of dissolving the gaseous $NH_3$ in water and reacting it with $Na_2O_2$ so that the $H_2O_2$ as it is being created can, in fact, react with the $NH_3$. The hydrazinehydrate can, for example, be separated from the remaining amonium by means of distillation.

Another possibility is to be seen in that one provides a mixture of $NH_3$ and $H_2O$ in the gaseous phase with $Na_2O_2$ in liquid or solid state to which other melting components or solid materials are added in order to obtain a deficiency, and the gaseous component, among them hydrazine as a hydrate, will be extracted rapidly by means of a pressure gradient. A third possibility is to be seen in liquefying the $NH_3$ as produced and reacting the liquefied $NH_3$ on one hand with $Na_2O_2$, and on the other hand with a watery solution of $Na_2O_2$ or $H_2O_2$.

The following is an example of process 3. The oxidation of the molten alkaliamide in air has the purpose of gaining nitrogen for the synthesis of amide. The oxygen of the air reacts with the amide, resulting in hydrazine. In order to permit the reaction of the oxygen of air with the said amide, the oxygen must at first be fixed to a carrier and then be made effective in active form. A possible carrier is metallic sodium in a dispersed consistency. Using this method makes it advisable that the resulting gaseous hydrazine, together with the residual nitrogen and other components of the air, are rapidly taken out of the molten bath via a pressure gradient whereby the gaseous material is cooled in order to avoid a reaction with the hot raw products in the molten bath. Preferably one can use here a two-phase nozzle in which the molten material serves as the liquid partially solidified non-gaseous phase. The carrier must be restored from the resulting sodium oxide by means of electrolysis in order to be returned.

As an example to the above described process 4 it should be considered here that the alkaliamide formation is considerably simplified because Li can form $Li_3N$ rather easily, provided there is no hydrogen present. The $Li_3N$ is then converted in the presence of nitrogen into lithiumamide and metallic lithium without requiring the presence of a catalyst. However, since $LiNH_2$ has a much higher melting point than $NaNH_2$, the former is difficult to handle and should be converted into $NaNH_2$. For this purpose the lithiumamide is thermally decomposed into $NH_3$ and lithiumamide at a temperature above 450° C. The resulting $NH_3$ is caused to combine with liquid sodium to produce $NaNH_2$ under the release of hydrogen which is being used up in the formation of lithiumamide and metallic lithium in accordance with the equation 19, above.

The invention is not limited to the embodiments described above but all changes and modifications thereof not constituting departures from the spirit and scope of the invention are intended to be included.

We claim:

1. Method of a combined synthesis of hydrazine and hydrogen peroxide, under utilization of water and nitrogen, comprising:

electrolytically generating an electron donor and an electron acceptor in the form of an alkali metal and its peroxide by way of electrolysis of alkali-oxide carried out at an elevated temperature;

reacting a first portion of the alkali-peroxide with water to produce the hydrogen-peroxide by hydrolisis, alkali-hydroxide being an additional reaction product;

reacting a second portion of the alkali-peroxide with molten alkali-amide to produce hydrazine and first alkali-oxide;

using some of the alkali metal as produced pursuent to the said generating step, as well as requisite quantities of nitrogen and hydrogen, to produce the alkali amide;

generating the hydrogen to be used in the preceding step from the alkali-hydroxide and some of the alkali metal as generated, resulting in second alkali-oxide;

and using said first and second alkali-oxide in the electrolytic generating step.

2. Method as in claim 1, wherein the nitrogen is produced from air, in that alkali metal and alkaliamide reacts with the oxygen of the air to produce alkali-peroxide which, as it is generated, reacts with the alkaliamide to produce hydrazine and alkali-oxide.

3. Method as in claim 1 or 2, wherein the alkaliamide-producing step includes utilization of a second alkali metal forming an alkali-nitrogen compound at a relatively high reaction rate, and using the first alkali metal to displace the second alkali oxide in the nitrogen compound to obtain the said alkaliamide, while the second metal is again available for the said high rate formation.

4. Method as in claim 3, wherein the first alkali metal is sodium, the second alkali metal is lithium.

5. Method as in claim 1 or 2, wherein the alkaliamide is produced catalytically.

* * * * *